Patented July 18, 1939

2,166,152

UNITED STATES PATENT OFFICE 2,166,152

HYDROGENATION OF ALIPHATIC DINITRILES

Benjamin W. Howk, Wilmington, Del., assignor to E. I. du Pont de Nemours & Company, Wilmington, Del., a corporation of Delaware No Drawing. Application August 30, 1938, Serial No. 227,479

10 Claims. (Cl. 260—583)

This invention relates to a process for producing aliphatic diamines having from 6 to 10 carbons by catalytic hydrogenation of the corresponding aliphatic dinitriles. More specifically, this invention relates to processes for the liquid phase catalytic hydrogenation of adiponitrile to hexamethylene diamine.

In the copending application of Benjamin W. Howk, Serial No. 127,203, filed February 23, 1937, there is disclosed a process for the catalytic hydrogenation of adiponitrile to hexamethylene diamine, using nickel as the hydrogenation catalyst. Prior to the discovery claimed in the aforementioned application, diamines in general were prepared by laborious and inefficient methods among which may be mentioned the sodium reduction of dinitriles, the hypochlorite degradation of diamides, the reaction of dihalides with ammonia, etc. Most of these methods involve the use of aqueous solutions, salts, etc., from which it is extremely difficult to isolate the diamines in pure form. The process claimed in the aforementioned application was the first practical method of converting aliphatic dinitriles, and especially adiponitrile, to the corresponding diamines. This process, however, is open to certain objections even though in the case of adiponitrile conversions to hexamethylene diamine of 90 to 91% are obtained. Among these objections may be mentioned the fact that (1) along with the desired primary amine there are obtained 9 to 10% of hexamethylene imine and polymeric secondary amines whose presence raises purification problems and increases costs, and (2) the fact that in the case of nickel, the use of ammonia is necessary for the successful hydrogenation of the dinitriles to the corresponding diamines.

It has now been discovered that these disadvantages may be overcome by the use of a cobalt catalyst. For example, with a cobalt catalyst hexamethylene diamine in yields as high as 97% of theoretical can be obtained by catalytically hydrogenating adiponitrile with only a trace of by-products, and even in the absence of ammonia, yields as high as 89% of theoretical are obtained. Likewise, in the hydrogenation of succinonitrile with cobalt catalysts, yields of about 36% of diamine are obtained, whereas under comparable conditions with nickel the yields are of the order of about 5%. With the longer chain dinitriles such as sebaconitrile cobalt catalysts produce a marked improvement over nickel in reducing the amount, or eliminating the use of ammonia. This discovery with respect to cobalt appears to be specific for the conversion of aliphatic dinitriles to aliphatic diamines.

Heretofore cobalt has been considered as somewhat inferior in all respects to nickel as a hydrogenation catalyst, although it may be considered as operative in the eyes of the patent law and therefore grouped with nickel in showing the types of operative catalysts that may be used in a given reaction. Thus, while hydrogenation catalysts prepared from cobalt have been mentioned many times in the literature, they have not received the attention which has been given to catalysts prepared from nickel. For example, as early as 1908, Mailhe (Chem. Ztg., 31, 1083 (1908)) made a comparative study of nickel, cobalt, and copper catalysts in vapor phase hydrogenation reactions. According to Mailhe, nickel was a better catalyst than cobalt not only because of its longer period of active life, but also because it gave higher conversions during the relatively short contact time of vapor phase procedures. Kelber (Ber. 49, 55–63 (1916)), who studied the hydrogenation of cinnamic acid and similar compounds, concluded that cobalt could replace nickel for this purpose but was not as satisfactory because its rate of reduction was slower. The similarity of nickel and cobalt as hydrogenation catalysts has been set forth by the art as evidenced by the following statement from page 178 in Sabatier-Reid's "Catalysis in Organic Chemistry," D. Van Nostrand & Co. (1923):

"Finely divided cobalt such as is produced by the reduction of the oxide in the hydrogenation tube itself, seems to be able to take the place of nickel in all the various reactions which nickel can catalyze.

"But its use is disadvantageous because its activity is lower and is more easily destroyed than that of nickel; because higher temperatures are required when using it; and also because the reduction of its oxide is practicable only in the neighborhood of 400° C., and hence the oxide resulting from spontaneous oxidation during the time the apparatus is cold and out of use, cannot be reduced at temperatures below 250°, such as are commonly used in hydrogenation."

Sabatier-Reid give several examples showing the decline in activity of cobalt catalysts during the course of a hydrogenation reaction. Confirmation of this opinion is provided by Otto Schmidt (Z. Phys. Chem. 118, 205, 209 (1925)) who carried out a theoretical study of the activity of nickel, cobalt, and other hydrogenation catalysts. Schmidt concluded that nickel was the most effective catalyst in hydrogenation reactions owing to its small ionic radius. More recently Green in his book on "Industrial Catalysis", Ernest Benn Limited (1928), page 168, points out that cobalt, as well as platinum and palladium, are usually effective for a short time only.

It is evident from the past experience of workers in the hydrogenation field that one could not possibly predict that cobalt hydrogenation catalysts would give the new and unexpected results obtained when adopted for converting aliphatic dinitriles to the corresponding diamines. This discovery therefore represents a marked advance in this limited catalytic field.

It is an object of this invention to prepare by an improved process aliphatic diamines having from 6 to 10 carbon atoms by catalytically hydrogenating the corresponding dinitriles. Another object is to develop an improved process for the catalytic hydrogenation of adiponitrile to hexamethylene diamine. Still another object is to provide a process for the preparation of hexamethylene diamine by catalytic hydrogenation of adiponitrile with minimum formation of by-products and maximum yields. Another object is to catalytically hydrogenate adiponitrile to hexamethylene diamine in the absence of ammonia. Other objects will appear hereinafter.

These objects are accomplished by means of the following invention which comprises catalytically hydrogenating in aliphatic dinitrile having from 6 to 10 carbon atoms in the presence of a cobalt hydrogenation catalyst at a temperature within the range of 50° to 170° C. More specifically, the invention is carried out by bringing a mixture comprising essentially ammonia, the dinitrile, and hydrogen into contact with a cobalt hydrogenation catalyst at a temperature within the range of 50° to 170° C. It is preferable to carry out the reaction in the liquid phase and in the presence of dry liquid ammonia.

The following examples set forth certain well-defined instances of the application of this invention. They are, however, not to be considered as limitations thereof since many modifications may be made without departing from the spirit and scope of said invention.

*Example I*

Ninety-nine grams of adiponitrile, 75 grams of anhydrous ammonia and 15 grams of a supported cobalt catalyst are sealed in a small shaking autoclave. Hydrogen is forced into the autoclave until the total pressure is within the range of 1,000 to 2,000 lbs. The nitrile undergoes hydrogenation at a temperature of 95° to 120° C. and the reaction is complete within one hour. The main product of the reaction, which is best isolated by fractional distillation, is hexamethylene diamine, a white crystalline solid, M. P. 41° C., boiling point 90° to 92° C. at 14 mm. The yield of this diamine is 103.8 grams equivalent to 97.7% conversion. Small quantities of hexamethylene imine, boiling point 136° to 138° C., and soluble high molecular weight amine compounds are obtained as by-products from the reaction.

*Example II*

A high pressure autoclave equipped with a stirring device is charged with 2,000 grams of adiponitrile, 1,500 grams of anhydrous ammonia and 300 grams of an active supported cobalt hydrogenation catalyst. Hydrogen under pressure is admitted to the autoclave and the mixture heated to 120° C. Hydrogen is rapidly absorbed over a period of 1.5 hours, the total pressure being maintained within the range from 1,500 to 2,000 lbs./sq. in. by the addition of more hydrogen as needed from high pressure storage tanks. The autoclave is cooled, the charge taken up in warm methanol, and the mixture is filtered to separate the catalyst. Fractional distillation of an aliquot shows the conversion to hexamethylene diamine to be 97.2% of the theory.

*Example III*

An active cobalt hydrogenation catalyst suitable for the hydrogenation of adiponitrile to hexamethylene diamine is prepared by the following procedure: A solution of 124 grams of sodium bicarbonate in 2.5 liters of water is added to a suspension of 47 grams of natural, untreated kieselguhr in a solution of 150 grams of cobalt nitrate in 0.31 liter of water. Cobalt carbonate is precipitated on the surface of the kieselguhr. This mixture is then digested at 80° C. for 2 hours. The product is filtered, washed and dried and the cobalt carbonate is reduced to elementary cobalt by heating in a stream of hydrogen at 475° C. over a period of 2 or 3 hours. The resulting catalyst powder is quite effective in promoting hydrogenation reactions and is particularly useful in the hydrogenation of adiponitrile to hexamethylene diamine as illustrated in the following example.

Ninety-eight and eight-tenths grams of adiponitrile, 75 grams of ammonia and 15 grams of the cobalt-on-kieselguhr catalyst are sealed in a hydrogenation autoclave. The mixture is treated with hydrogen in accordance with the process of Example I at a temperature of 120° C. and under a total pressure between 1,200 and 2,500 lbs./sq. in. The absorption of hydrogen is complete in about 15 minutes. The autoclave is cooled, the product dissolved in methanol and filtered to remove the catalyst. Vacuum fractional distillation of the products yields 100.8 grams of pure hexamethylene diamine, a conversion of 95.1% based on the adiponitrile charge into the autoclave.

If, by way of contrast, a sample of 99.5 grams of adiponitrile is hydrogenated according to the above conditions except that a nickel catalyst similarly prepared is used, the yield of hexamethylene diamine is only 91.1 grams, a conversion of 85.2% of the theory.

*Example IV*

One hundred grams of adiponitrile and 15 grams of a finely divided alumina-supported cobalt are charged into an autoclave and hydrogenated at 120° C. under a total pressure of 2000 lbs./sq. in. Hydrogen absorption occurs over a period of one hour. On working up the product there is obtained 93.1 grams of pure hexamethylene diamine, a conversion of 86.7% of the theory. In addition, 4.7 grams of hexamethylene imine and 6.7 grams of high boiling amines are obtained.

*Example V*

Sixty-eight grams of pimelonitrile, 50 grams of anhydrous liquid ammonia, and 6 grams of an active cobalt catalyst are charged into a high pressure autoclave and subjected to a hydrogen pressure of about 1500 lbs./sq. in. The autoclave and its contents are heated to a temperature of 120° C. whereupon the absorption of hydrogen takes place rapidly. The reaction is continued during a period of about one hour, and from time to time fresh hydrogen is admitted in order to maintain the total pressure between 1500 and about 2500 lbs./sq. in. When the absorption of hydrogen has ceased, as evidenced by no further drop in pressure, the reaction tube is cooled, the pressure released, and the contents removed by washing with methanol. The catalyst is separated from the solution by filtration and the combined filtrate and methanol washings worked up by fractional distillation. After distilling the solvent there is obtained 59 grams of heptamethylene diamine, B. P. 100° to 101° C./11 mm. Only small traces of the corresponding heptamethylene imine and high boiling polymeric residue are obtained.

*Example VI*

A 100 gram sample of suberonitrile (hexamethylene dicyanide) is hydrogenated in a high pressure autoclave according to the procedure of Example V. The reaction is carried out in the presence of 75 grams of ammonia, and 10 grams of a catalyst comprising finely divided elementary cobalt. At a temperature of about 120° C. the reaction is complete in slightly more than one hour. Upon working up the product, there is obtained 102.8 grams of octamethylene diamine, B. P. 122° to 123° C./18 mm. The yield is 97.2% of theory.

*Example VII*

Two thousand grams of sebaconitrile (1500 g. of anhydrous ammonia, and 250 g. of a finely divided active cobalt hydrogenation catalyst) are charged into an autoclave suitable for operation at high temperatures and pressures and equipped with an efficient stirring device. The mixture is subjected to hydrogen pressures in the neighborhood of 1500 to 2000 lbs./sq. in. at temperatures ranging from 115° to 125° C. The reaction proceeds rapidly with the absorption of hydrogen as evidenced by a decrease in pressure, and the pressure is maintained within the prescribed range by admitting fresh quantities from high pressure storage tanks. The reaction is completed in about 1.5 hours, and thereafter the autoclave is cooled and the product removed. The crude solid product is dissolved in methanol and filtered to separate the spent catalyst, and after distilling the solvent, the hydrogenated mixture is purified by vacuum fractional distillation. There is obtained 2030 grams of pure decamethylene diamine, B. P. 140° C./12 mm., which corresponds to a yield of 96.8% of theory. In addition to decamethylene diamine a small quantity of high molecular weight polymeric material is obtained.

Although the above examples indicate certain definite conditions of temperature, pressure, concentration, times of reaction, catalyst, etc., it is to be understood that these values may be varied somewhat within the scope of this invention. In general, the processes of this invention are operable at temperatures ranging from 50° to 170° C. and at pressures ranging from atmospheric to a maximum determined by the practical limitations of the vessel used in carrying out the reaction. It is advisable when working in the liquid phase to maintain a pressure higher and a temperature lower than the corresponding critical values for ammonia if this ingredient is used, in order that it be preserved in the liquid state. In this connection it might be noted that the vapor pressure of ammonia at 50° is 15,000 mm. of mercury (19.75 atmospheres or 290 lbs./sq. in.). A pressure in excess of 290 lbs./sq. in. should therefore be used and for practical purposes a pressure within the range of 500 to 4000 lbs./sq. in. is desirable. It is preferred to operate the process in the liquid phase in the presence of ammonia at a temperature of 115° to 140° C. and under a total pressure of 1200 to 2600 lbs./sq. in. The quantity of ammonia used may be varied considerably but it is preferable to use at least 20 parts by weight of ammonia per 100 parts by weight of adiponitrile.

The type and amount of cobalt catalyst employed in this invention may be varied considerably. Pyrophoric or stabilized cobalt catalysts either in the massive state or supported on suitable powdered materials such as kieselguhr, alumina, and magnesia are very effective in producing a rapid hydrogenation of the adiponitrile with a maximum yield of primary amine. Such catalysts may be prepared by reducing with hydrogen cobalt compounds such as cobalt carbonate, oxide, or hydroxide either alone or precipitated on suitable supporting materials; or cobalt compounds, such as cobalt oxide, chloride, sulfate and others may be reduced to the metal by means of sodium. Such catalysts may exist either wholly or in part in the reduced state and further reduction of the catalyst may occur during the hydrogenation process.

The process described herein may be carried out in the presence of an inert organic solvent such as alcohol, ether, or a hydrocarbon solvent. As examples of specific solvents one may use either methanol, dioxane or toluene. It is preferred, however, to carry out the reaction in the absence of solvents other than ammonia.

The hexamethylene diamine produced by the processes of this invention has many industrial uses either as such or as an intermediate used in the manufacture of other important products.

This invention offers many advantages over the prior art from the standpoint of economy and efficiency. From the economic point of view this discovery is important not only because of the improved yields of diamines but also because of the lesser quantities of ammonia that can be used in the hydrogenation reaction. Thus, cobalt will produce almost as high a yield of hexamethylene diamine in the absence of ammonia as nickel will produce in the presence of the required amount of ammonia, whereas in the absence of ammonia nickel is inoperative for the production of the diamine. This is an important factor in determining equipment requirements for commercial production. Another important advantage afforded by the adoption of the cobalt catalysts is that hexamethylene diamine is obtained with the minimum of undesired side reaction products such as cyclic amines and polymeric amines. Pure anhydrous hexamethylenediamine is recovered from the reaction mixture in high yields by simple fractional distillation process.

Since many apparently and widely different embodiments of this invention may be made without departing from the spirit or scope thereof, it is to be understood that the invention is not to be limited to the specific embodiments thereof, except as defined in the following appended claims.

I claim:

1. The process which comprises catalytically hydrogenating an aliphatic dinitrile having from 6 to 10 carbon atoms in the presence of a cobalt hydrogenation catalyst at a temperature between 50° and 170° C.

2. The process which comprises catalytically hydrogenating in the liquid phase an aliphatic dinitrile having 6 to 10 carbon atoms in the presence of a cobalt hydrogenation catalyst and in the presence of liquid ammonia at a temperature between 50° and 170° C.

3. The process in accordance with claim 1 characterized in that the reaction is carried out in the liquid phase.

4. The process for the preparation of hexamethylene diamine which comprises catalytically hydrogenating adiponitrile in the presence of a cobalt hydrogenation catalyst at a temperature between 50° and 170° C.

5. The process in accordance with claim 4 characterized in that the reaction is carried out in the liquid phase.

6. The process in accordance with claim 4 characterized in that the reaction is carried out in the liquid phase and in the presence of liquid ammonia.

7. The process for the preparation of hexamethylene diamine which comprises bringing liquid adiponitrile into contact with hydrogen in the presence of a cobalt hydrogenation catalyst and in the presence of anhydrous ammonia at a temperature within the range of 50° to 170° C. and at a pressure in excess of 290 lbs./sq. in.

8. The process for the preparation of hexamethylene diamine which comprises bringing adiponitrile into contact with hydrogen in the presence of a cobalt hydrogenation catalyst at a temperature of about 115° to about 140° C. and under a pressure of about 1200 to about 2600 lbs./sq. in. in the presence of ammonia in amount of at least one-fifth of the weight of the adiponitrile.

9. The process for the preparation of octamethylenediamine which comprises bringing liquid suberonitrile into contact with hydrogen in the presence of a cobalt hydrogenation catalyst and in the presence of anhydrous ammonia at a temperature within the range of 50° to 170° C. and at a pressure in excess of 290 lbs. per sq. in.

10. The process for the preparation of decamethylenediamine which comprises bringing liquid sebaconitrile into contact with hydrogen in the presence of a cobalt hydrogenation catalyst and in the presence of anhydrous ammonia at a temperature within the range of 50° to 170° C. and at a pressure in excess of 290 lbs. per sq. in.

BENJAMIN W. HOWK.